US009253798B2

(12) United States Patent
Pani et al.

(10) Patent No.: US 9,253,798 B2
(45) Date of Patent: Feb. 2, 2016

(54) METHOD AND APPARATUS FOR OPTIMIZING UPLINK RANDOM ACCESS CHANNEL TRANSMISSION

(75) Inventors: Diana Pani, Montreal (CA); Sylvie Gomes, Douglaston, NY (US); Bhaskar M. Anepu, Lancaster, PA (US); Paul Marinier, Brossard (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 245 days.

(21) Appl. No.: 13/026,033

(22) Filed: Feb. 11, 2011

(65) Prior Publication Data

US 2011/0274040 A1   Nov. 10, 2011

Related U.S. Application Data

(60) Provisional application No. 61/304,372, filed on Feb. 12, 2010, provisional application No. 61/320,410, filed on Apr. 2, 2010, provisional application No. 61/329,777, filed on Apr. 30, 2010, provisional application No. 61/356,479, filed on Jun. 18, 2010.

(51) Int. Cl.
*H04W 74/00* (2009.01)
*H04W 4/00* (2009.01)
(Continued)

(52) U.S. Cl.
CPC ............ *H04W 74/006* (2013.01); *H04W 4/005* (2013.01); *H04W 4/08* (2013.01); *H04W 74/0833* (2013.01)

(58) Field of Classification Search
CPC ..... H04W 36/00; H04W 28/00; H04W 74/00; H04L 29/00
USPC .......... 370/232, 328, 335; 709/224, 226, 236; 455/458
See application file for complete search history.

(56) References Cited

U.S. PATENT DOCUMENTS 6,111,570 A * 8/2000 Sugikawa et al. ............. 715/748
7,296,083 B2 * 11/2007 Barham et al. ...... H04L 12/2602
370/229

(Continued)

FOREIGN PATENT DOCUMENTS

EP   1 143 755   10/2001
EP   1 814 270   8/2007

(Continued)

OTHER PUBLICATIONS

Catt, "Access Control of MTC Devices," R2-100182, 3GPP TSG RAN WG2 Meeting #68bis, Valencia, Spain, Jan. 18-22, 2010.

(Continued)

*Primary Examiner* — Andrew Lai
*Assistant Examiner* — Sumitra Ganguly
(74) *Attorney, Agent, or Firm* — Volpe and Koenig, P.C.

(57) ABSTRACT

Method and apparatus are disclosed for optimizing Random Access Channel (RACH) transmissions from wireless transmit/receive units (WTRUs) for multiple transmissions. A WTRU may initiate uplink transmission for a random access procedure using a configured time resource such that the uplink resources may be time shared by a plurality of WTRUs. The transmission time may be calculated on an absolute or relative basis. A backoff time may be applied before starting the uplink transmission. The backoff time may be WTRU-specific, WTRU group-specific, specified per access class and may be determined based on a priority basis. A scaling factor may be applied to the backoff time. A contention free allocation method may be used to determine the appropriate resource. The data may be transmitted with and without a preamble. The WTRUs may include machine type communication devices and may be grouped in accordance with a number of factors or characteristics.

13 Claims, 6 Drawing Sheets

(51) Int. Cl.
H04W 4/08 (2009.01)
H04W 74/08 (2009.01)

(56) References Cited

U.S. PATENT DOCUMENTS

| | | | |
|---|---|---|---|
| 7,715,845 B2 | 5/2010 | Jin et al. | |
| 8,111,639 B2* | 2/2012 | Imamura et al. | 370/278 |
| 8,576,784 B2 | 11/2013 | Lohr et al. | |
| 2004/0057407 A1* | 3/2004 | Balachandran et al. | H04W 72/0446 370/336 |
| 2004/0146019 A1 | 7/2004 | Kim et al. | |
| 2004/0224709 A1 | 11/2004 | Yi et al. | |
| 2007/0204046 A1* | 8/2007 | Batta et al. | 709/226 |
| 2007/0254679 A1* | 11/2007 | Montojo et al. | 455/458 |
| 2007/0266178 A1* | 11/2007 | Wong et al. | H04L 49/90 709/246 |
| 2008/0004050 A1 | 1/2008 | Bi et al. | |
| 2008/0043681 A1* | 2/2008 | Vimpari et al. | 370/335 |
| 2008/0225785 A1 | 9/2008 | Wang et al. | |
| 2008/0233976 A1* | 9/2008 | Ostrup et al. | H04W 74/0875 455/458 |
| 2009/0011769 A1* | 1/2009 | Park et al. | 455/450 |
| 2010/0036967 A1* | 2/2010 | Caine et al. | H04N 7/17318 709/236 |
| 2010/0151859 A1* | 6/2010 | Hsu | 455/434 |
| 2010/0190499 A1* | 7/2010 | Wu | 455/436 |

FOREIGN PATENT DOCUMENTS

| | | |
|---|---|---|
| EP | 1 954 087 | 8/2008 |
| EP | 1954087 | 8/2008 |
| JP | 2009049465 A2 | 3/2009 |
| WO | 2008033463 A1 | 3/2008 |
| WO | 2009/025494 | 2/2009 |

OTHER PUBLICATIONS

Huawei, et al., "New SI Proposal: RAN Improvements for Machine-Type Communications," RP-090991, 3GPP TSG-RAN #45, Sevilla, Spain, Sep. 15-18, 2009.
Interdigital, "Group Based Registration and Access (Device Based Operation)," TD S1-100144, 3GPP TSG SA WG1 Meeting #49, San Francisco, USA, Feb. 22-26, 2010.
Interdigital Communication Corporation, "Group Based Access for TS 22.368," S1-100139, 3GPP TSG-SA1 #49, San Francisco, USA, Feb. 22-26, 2010.
KPN et al., "Clarification of Time Controlled," S1-100109, 3GPP TSG-SA1 #49, San Francisco, USA, Feb. 22-26, 2010.
NTT Docomo, Inc., "Access Class Barring," R2-073373, 3GPP TSG RAN WG2 #59, Athens, Greece, Aug. 20-24, 2007.
Third Generation Partnership Project, "Technical Specification Group Radio Access Network; Evolved Universal Terrestrial Radio Access (E-UTRA); Radio Resource Control (RRC); Protocol Specification (Release 8)," 3GPP TS 36.331 v8.8.0, Jan. 2010.
Third Generation Partnership Project, "Technical Specification Group Radio Access Network; Evolved Universal Terrestrial Radio Access (E-UTRA); Radio Resource Control (RRC); Protocol Specification (Release 8)," 3GPP TS 36.331 v8.12.0, Dec. 2010.
Third Generation Partnership Project, "Technical Specification Group Radio Access Network; Evolved Universal Terrestrial Radio Access (E-UTRA); Radio Resource Control (RRC); Protocol Specification (Release 9)," 3GPP TS 36.331 v9.1.0, Jan. 2010.
Third Generation Partnership Project, "Technical Specification Group Radio Access Network; Evolved Universal Terrestrial Radio Access (E-UTRA); Radio Resource Control (RRC); Protocol Specification (Release 9)," 3GPP TS 36.331 v.9.5.0, Dec. 2010.
Third Generation Partnership Project, "Technical Specification Group Radio Access Network; Evolved Universal Terrestrial Radio Access (E-UTRA); Radio Resource Control (RRC); Protocol Specification (Release 10)," 3GPP TS 36.331 v10.0.0, Dec. 2010.
Third Generation Partnership Project, "Technical Specification Group Radio Access Network; Medium Access Control (MAC) Protocol Specification (Release 7)," 3GPP TS 25.321 v 7.15.0, Jan. 2010.
Third Generation Partnership Project, "Technical Specification Group Radio Access Network; Medium Access Control (MAC) Protocol Specification (Release 7)," 3GPP TS 25.321 v 7.19.0, Dec. 2010.
Third Generation Partnership Project, "Technical Specification Group Radio Access Network; Medium Access Control (MAC) Protocol Specification (Release 8)," 3GPP TS 25.321 v 8.8.1, Jan. 2010.
Third Generation Partnership Project, "Technical Specification Group Radio Access Network; Medium Access Control (MAC) Protocol Specification (Release 8)," 3GPP TS 25.321 v 8.12.0, Dec. 2010.
Third Generation Partnership Project, "Technical Specification Group Radio Access Network; Medium Access Control (MAC) Protocol Specification (Release 9)," 3GPP TS 25.321 v 9.1.0, Jan. 2010.
Third Generation Partnership Project, "Technical Specification Group Radio Access Network; Medium Access Control (MAC) Protocol Specification (Release 9)," 3GPP TS 25.321 v 9.5.0, Dec. 2010.
Third Generation Partnership Project, "Technical Specification Group Radio Access Network; Medium Access Control (MAC) Protocol Specification (Release 10)," 3GPP TS 25.321 v 10.1.0, Dec. 2010.
Third Generation Partnership Project, "Technical Specification Group Radio Access Network; Physical Layer Procedure (FDD) (Release 7)," 3GPP TS 25.214 v7.14.0, Dec. 2009.
Third Generation Partnership Project, "Technical Specification Group Radio Access Network; Physical Layer Procedure (FDD) (Release 7)," 3GPP TS 25.214 v7.17.0, Dec. 2010.
Third Generation Partnership Project, "Technical Specification Group Radio Access Network; Physical Layer Procedure (FDD) (Release 8)," 3GPP TS 25.214 v8.8.0, Dec. 2009.
Third Generation Partnership Project, "Technical Specification Group Radio Access Network; Physical Layer Procedure (FDD) (Release 8)," 3GPP TS 25.214 v8.11.0, Dec. 2010.
Third Generation Partnership Project, "Technical Specification Group Radio Access Network; Physical Layer Procedure (FDD) (Release 9)," 3GPP TS 25.214 v9.1.0, Dec. 2009.
Third Generation Partnership Project, "Technical Specification Group Radio Access Network; Physical Layer Procedure (FDD) (Release 9)," 3GPP TS 25.214 v9.4.0, Dec. 2010.
Third Generation Partnership Project, "Technical Specification Group Radio Access Network; Physical Layer Procedure (FDD) (Release 10)," 3GPP TS 25.214 v10.1.0, Dec. 2010.
Third Generation Partnership Project, "Technical Specification Group Radio Access Network; Radio Resource Control (RRC); Protocol Specification (Release 7)," 3GPP TS 25.331 v7.15.0, Jan. 2010.
Third Generation Partnership Project, "Technical Specification Group Radio Access Network; Radio Resource Control (RRC); Protocol Specification (Release 7)," 3GPP TS 25.331 v7.18.0, Oct. 2010.
Third Generation Partnership Project, "Technical Specification Group Radio Access Network; Radio Resource Control (RRC); Protocol Specification (Release 8)," 3GPP TS 25.331 v8.9.0, Jan. 2010.
Third Generation Partnership Project, "Technical Specification Group Radio Access Network; Radio Resource Control (RRC); Protocol Specification (Release 8)," 3GPP TS 25.331 v8.13.0, Jan. 2011.
Third Generation Partnership Project, "Technical Specification Group Radio Access Network; Radio Resource Control (RRC); Protocol Specification (Release 9)," 3GPP TS 25.331 v9.1.0, Jan. 2010.
Third Generation Partnership Project, "Technical Specification Group Radio Access Network; Radio Resource Control (RRC); Protocol Specification (Release 9)," 3GPP TS 25.331 v9.5.0, Jan. 2011.
Third Generation Partnership Project, "Technical Specification Group Radio Access Network; Radio Resource Control (RRC); Protocol Specification (Release 10)," 3GPP TS 25.331 v10.2.0, Jan. 2011.
Third Generation Partnership Project, "Technical Specification Group Services and System Aspects; Service Requirements for Machine-Type Communications; Stage 1 (Release 10)," 3GPP TS 22.368 v1.1.1, Dec. 2009.

(56) References Cited

OTHER PUBLICATIONS

Third Generation Partnership Project, "Technical Specification Group Services and System Aspects; Service Requirements for Machine-Type Communications; Stage 1 (Release 10)," 3GPP TS 22.368 v10.3.0, Dec. 2010.
Third Generation Partnership Project, "Technical Specification Group Services and System Aspects; Service Requirements for Machine-Type Communications; Stage 1 (Release 11)," 3GPP TS 22.368 v11.0.1, Dec. 2010.
Interdigital Communication Corporation, "Group Based Access for TS 22.368," S1-100139, 3GPP TSG-SA1 #49, San Franisco, USA, Feb. 22-26, 2010.
Third Generation Partnership Project, "Technical Specification Group Radio Access Network; Evolved Universal Terrestrial Radio Access (E-UTRA); Radio Resource Control (RRC); Protocol Specification (Release 9)," 3GPP TS 36.331 v9.5.0, Dec. 2010.
Third Generation Partnership Project, "Technical Specification Group Radio Access Network; Physical Layer Procedures (FDD) (Release 7)," 3GPP TS 25.214 v7.14.0, Dec. 2009.
Third Generation Partnership Project, "Technical Specification Group Radio Access Network; Physical Layer Procedures (FDD) (Release 7)," 3GPP TS 25.214 v7.17.0, Dec. 2010.
Third Generation Partnership Project, "Technical Specification Group Radio Access Network; Physical Layer Procedures (FDD) (Release 8)," 3GPP TS 25.214 v8.8.0, Dec. 2009.
Third Generation Partnership Project, "Technical Specification Group Radio Access Network; Physical Layer Procedures (FDD) (Release 8)," 3GPP TS 25.214 v8.11.0, Dec. 2010.
Third Generation Partnership Project, "Technical Specification Group Radio Access Network; Physical Layer Procedures (FDD) (Release 9)," 3GPP TS 25.214 v9.1.0, Dec. 2009.
Third Generation Partnership Project, "Technical Specification Group Radio Access Network; Physical Layer Procedures (FDD) (Release 9)," 3GPP TS 25.214 v9.4.0, Dec. 2010.
Third Generation Partnership Project, "Technical Specification Group Radio Access Network; Physical Layer Procedures (FDD) (Release 10)," 3GPP TS 25.214 v10.1.0, Dec. 2010.
Third Generation Partnership Project, "Technical Specification Group Services and System Aspects; Service Requirements for Machine-Type Communications; Stage 1 (Release 10)," 3GPP TS 22.368 v.10.3.0, Dec. 2010.
Third Generation Partnership Project, "Technical Specification Group Services and System Aspects; Service Requirements for Machine-Type Communications; Stage 1 (Release 11)," 3GPP TS 22.368 v.11.0.0, Dec. 2010.
Ericsson et al., "Contention based uplink transmissions," 3GPP TSG-RAN WG2 #66bis, R2-093812, Los Angeles, California, USA (Jun. 29-Jul. 3, 2009).

* cited by examiner

METHOD AND APPARATUS FOR OPTIMIZING UPLINK RANDOM ACCESS CHANNEL TRANSMISSION

CROSS REFERENCE TO RELATED APPLICATIONS

This application claims the benefit of U.S. provisional application No. 61/304,372 filed Feb. 12, 2010; U.S. provisional application No. 61/320,410 filed Apr. 2, 2010; U.S. provisional application No. 61/329,777 filed Apr. 30, 2010; and U.S. provisional application No. 61/356,479 filed Jun. 18, 2010, the contents of which are hereby incorporated by reference herein.

FIELD OF THE INVENTION

This application is related to wireless communications.

BACKGROUND

In systems where a large number of devices may attempt to access a Random Access Channel (RACH) simultaneously, the RACH capacity may be impacted, delaying Uplink (UL) transmission for these devices and other devices, resulting in potential collisions, lost data, and excessive retransmissions. Given that most of these devices may perform a common control channel (CCCH) transmission, the probability of collision may increase and therefore failure of transmission may increase.

SUMMARY

Method and apparatus are disclosed for optimizing Random Access Channel (RACH) transmissions from wireless transmit/receive units (WTRUs) for multiple simultaneous transmissions. A WTRU may initiate uplink transmission for a random access procedure using a configured time resource such that the uplink resources may be time shared by a plurality of WTRUs. The transmission time may be calculated on an absolute or relative basis. A backoff may be applied before starting the uplink transmission. The backoff may be WTRU-specific, WTRU group-specific or specified per access class. A scaling factor may be applied to the backoff. The backoff may be determined based on a priority basis. A contention free allocation method may be used to determine the appropriate resource. The data may be transmitted with and without a preamble. The WTRUs may include machine type communication devices and may be grouped in accordance with a number of factors or characteristics.

BRIEF DESCRIPTION OF THE DRAWINGS

A more detailed understanding may be had from the following description, given by way of example in conjunction with the accompanying drawings wherein.

DETAILED DESCRIPTION

Figure 1A:
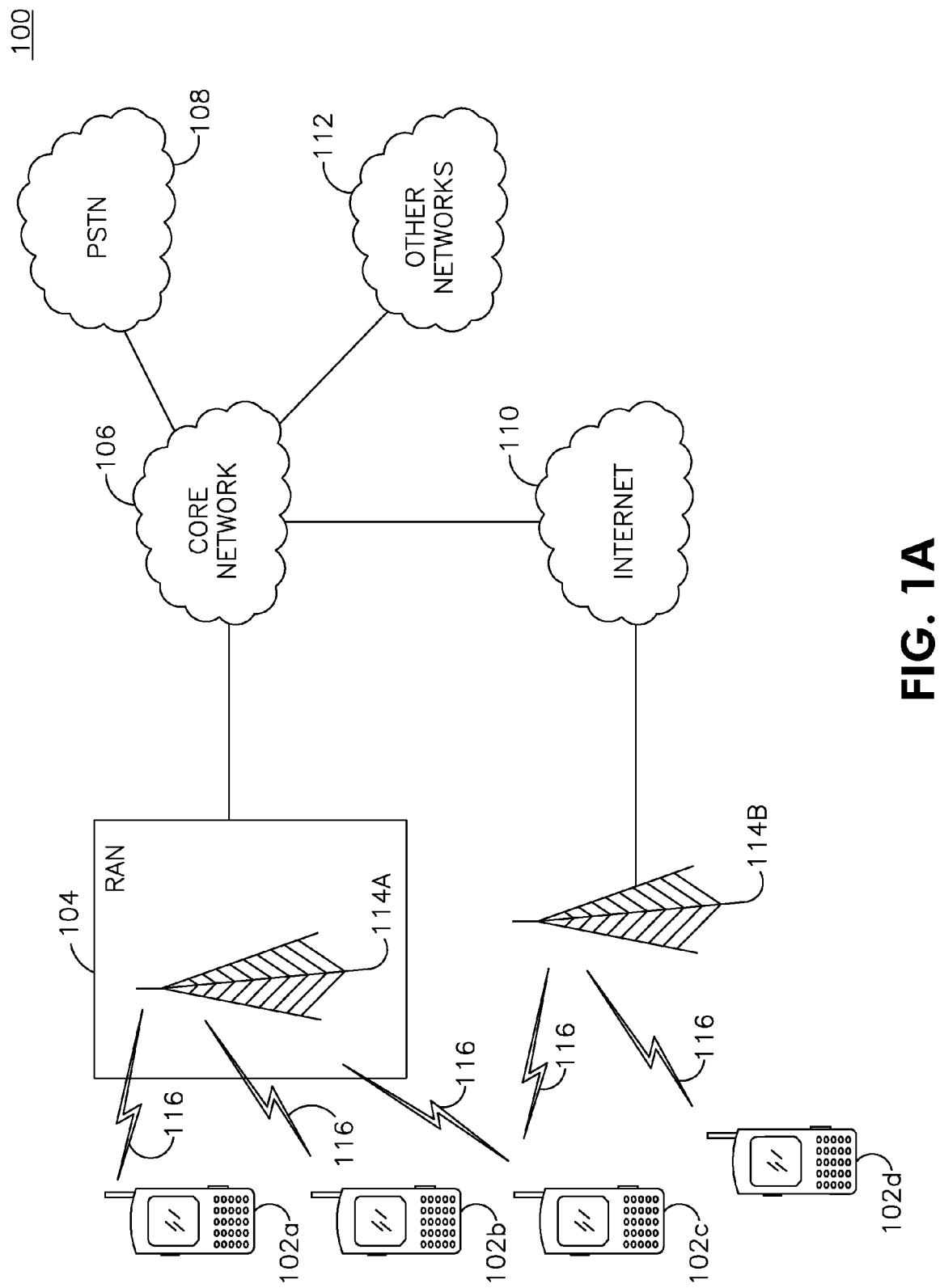
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), machine-type communications (MTC), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
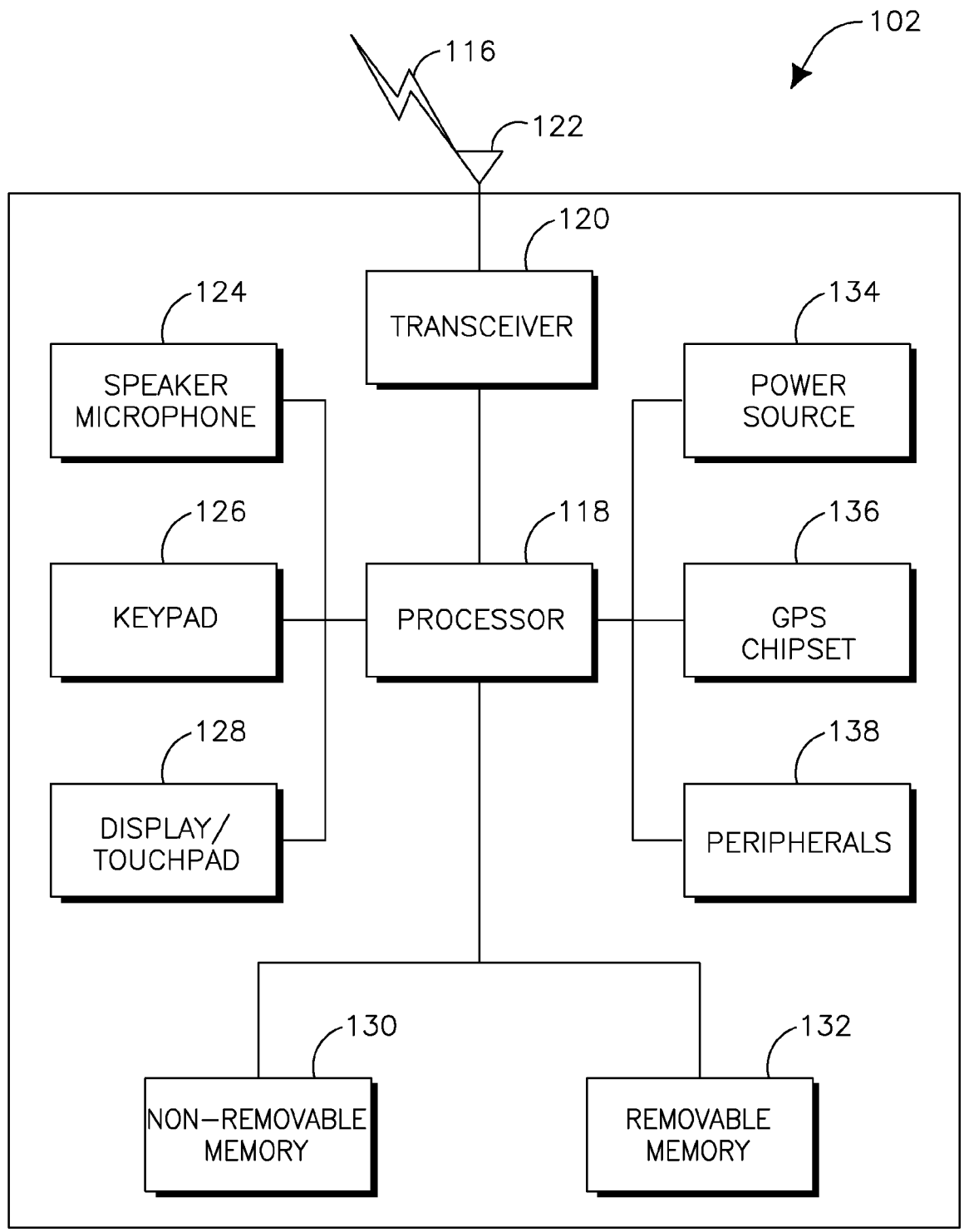
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 106, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 106 and/or the removable memory 132. The non-removable memory 106 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
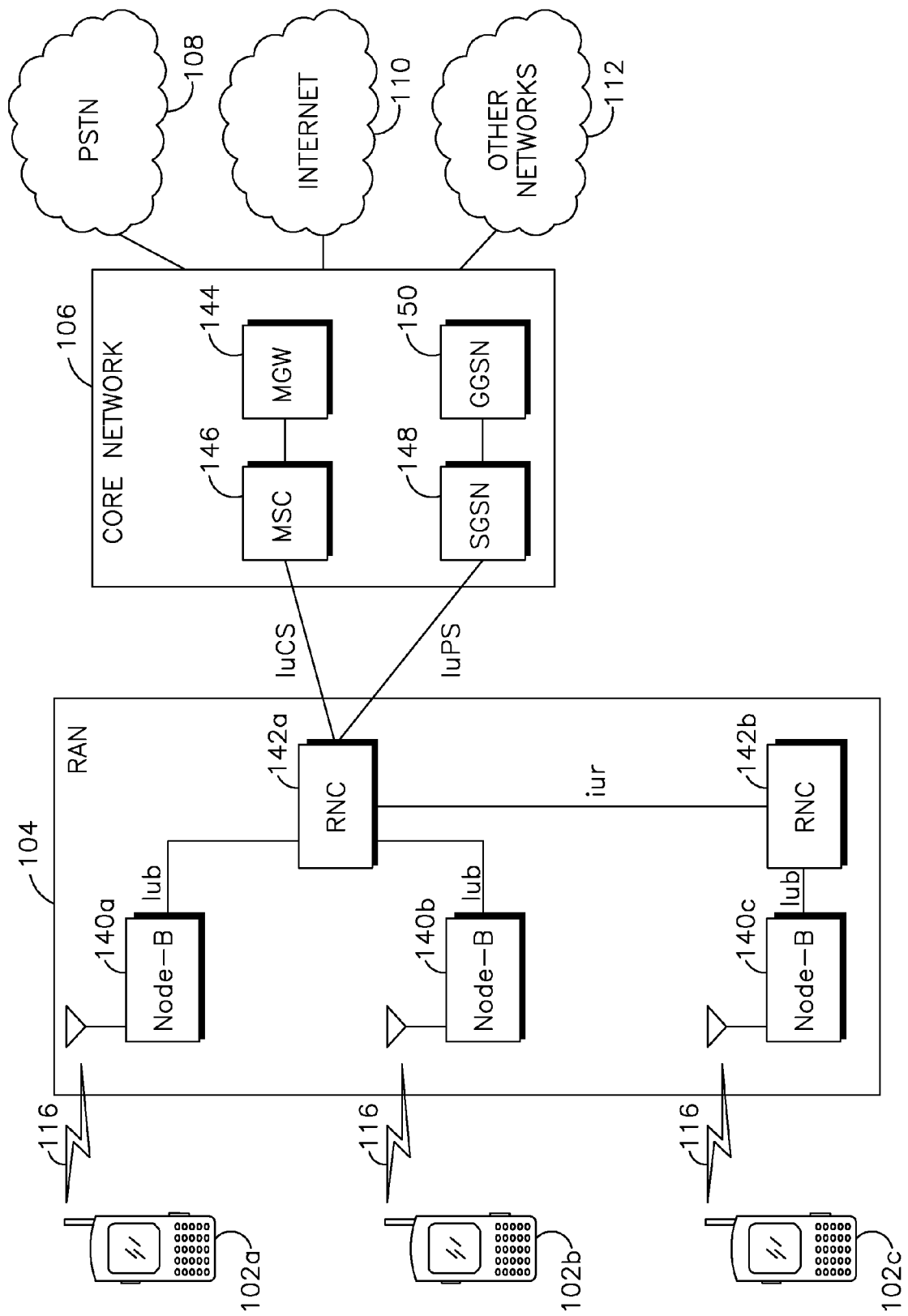
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ a UTRA radio technology to communicate with the WTRUs 102a, 102b, 102c over the air interface 116. The RAN 104 may also be in communication with the core network 106. As shown in FIG. 1C, the RAN 104 may include Node-Bs 140a, 140b, 140c, which may each include one or more transceivers for communicating with the WTRUs 102a, 102b, 102c over the air interface 116. The Node-Bs 140a, 140b, 140c may each be associated with a particular cell (not shown) within the RAN 104. The RAN 104 may also include RNCs 142a, 142b. It will be appreciated that the RAN 104 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 104 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 104 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 1D:
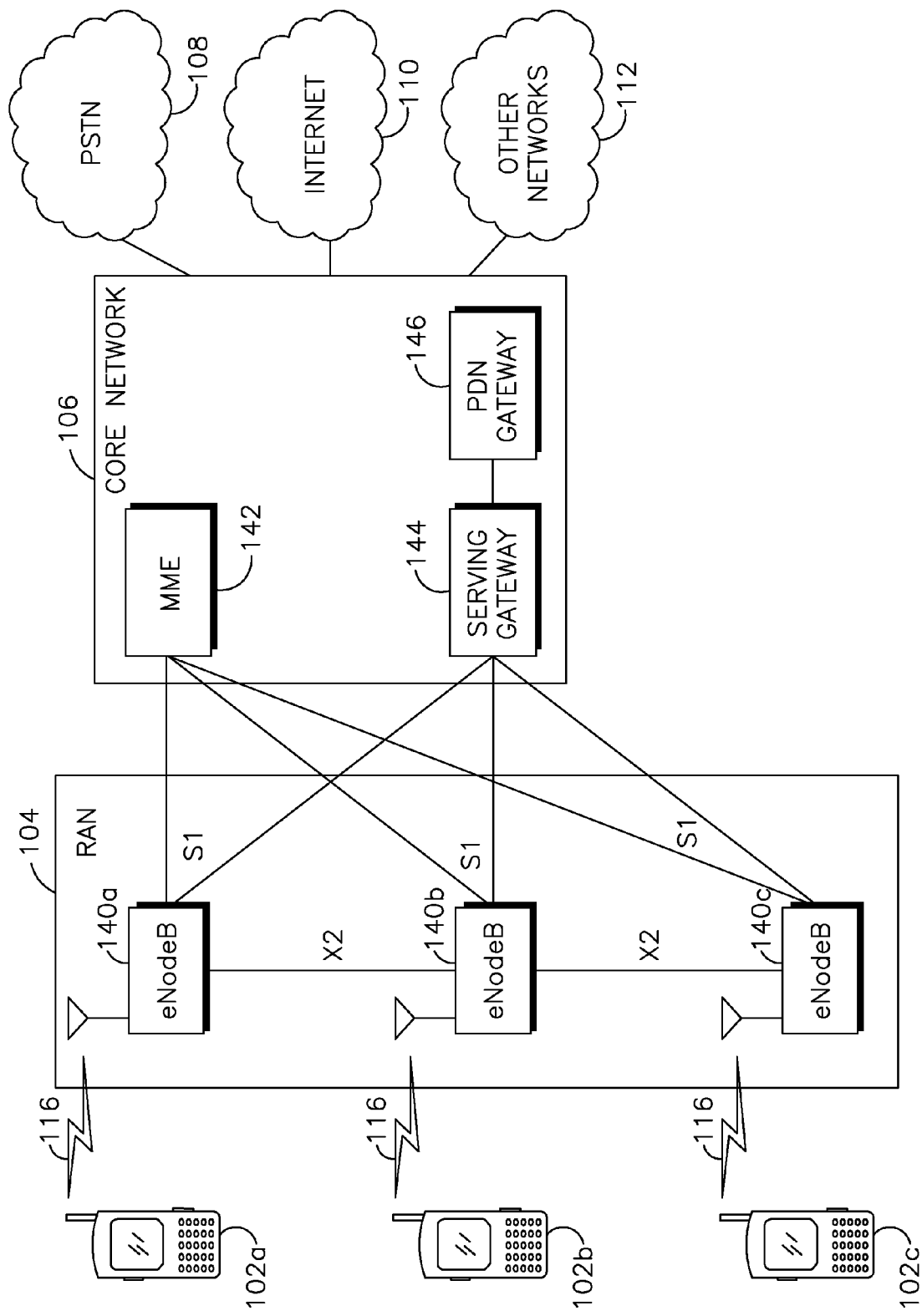
FIG. 1D is a system diagram of an example radio access network and an example core network that may be used within the communications system illustrated in FIG. 1A.

FIG. 1D is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1D, the eNode-Bs 140a, 140b, 140c may communicate with one another over an X2 interface.

The core network 106 shown in FIG. 1D may include a mobility management gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 142a, 142b, 142c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

As stated above, a WTRU may include a MTC. A MTC is a form of data communication, which involves one or more entities that do not necessarily need human interaction. Metering devices or tracking devices are typical examples of MTC devices. There are many different categories of features that have been defined for MTCs, each of them bringing different design challenges as follows: time controlled, time tolerant, packet switched (PS), online small data transmissions, offline small data transmissions, mobile originated, infrequent mobile terminated, MTC monitoring, offline indication, jamming indication, priority alarm message (PAM), extra low power consumption, secure connection, location specific trigger, and group based MTC features including group based policing and group based addressing. A service optimized for MTC may differ from a service optimized for human-to-human communications. An MTC may be different to the current mobile network communication services as it involves different market scenarios, data communications, lower costs and effort, a potentially large number of communicating terminals with, and to a large extent, little traffic per terminal. MTCs may have a great impact on random access (RA) procedures such as for example uplink (UL) Random Access Channel (RACH) access and transmissions. Although the term RACH may be used herein as an example, the methods described herein are applicable to any RA procedure that may be used in for example, UMTS, LTE or the like.

RACH procedures for universal mobile telecommunications system (UMTS) are described. In the Third Generation Partnership Project (3GPP) specifications, cell forward access channel (CELL_FACH) WTRUs are allowed to use an enhanced RACH mechanism, where the WTRU may be assigned enhanced dedicated channel (E-DCH) resources. The E-DCH resources are selected from a small pool of common resources that are shared amongst all the CELL_FACH WTRUs. The WTRUs may request use of the E-DCH resources using a legacy RACH ramp up procedure. As part of the legacy ramp up procedure, the WTRU may transmit a randomly selected signature sequence, (i.e., a preamble signature), in a randomly selected access slot. If the signature is correctly decoded, then the base station may respond to the WTRU with an E-DCH resource assignment from the pool of resources. The pool of resources is maintained for CELL_FACH WTRUs, and the details are signaled to the WTRUs through the broadcast system information.

In assigning the E-DCH resource, the base station may signal an index into which resource to use. This index may be signaled over an acquisition indicator channel (AICH)-like mechanism. The AICH is a downlink channel that echoes back the preamble signature, allowing the WTRU to know if its transmission was successful. This AICH signature may carry three values: negative one (−1), zero (0), and positive one (1). At a high level, the WTRU may request E-DCH resources with a preamble signature, while the base station may acknowledge the access and assigns the resource using the AICH signatures. There may be a one-to-one mapping between the preamble and AICH signature.

The method to signal the E-DCH resource to the WTRU may be based on the following principles. The preamble signatures may be segregated between the RACH and enhanced-RACH WTRUs. The former WTRUs may use the procedure detailed for Release 7 (and earlier). In addition, there may be a one-to-one mapping between RACH/enhanced-RACH signatures and AICH signatures. The WTRU may take the corresponding action upon reception of the AICH response.

For enhanced RACH WTRUs, each preamble signature may be associated with a default E-DCH resource. The base station may signal this resource assignment by sending an AICH equal to one (1) on the corresponding AICH signature. However, the base station may not limit itself to assigning the default resource tied to the preamble signature. If this resource is already assigned (or blocked), the base station may select another resource from the pool. This may be signaled through an enhanced AICH (E-AICH). If the WTRU receives an AICH that is equal to negative one (−1), then it may take this as an indication to look at the E-AICH. The E-AICH may contain either a resource assignment or a negative acknowledgement (NACK) indication. The latter may be used to inform the WTRU that it may not be assigned a resource and that it may perform a backoff and restart the preamble ramp up procedure. The E-AICH may be used to signal one resource assignment.

Described herein are access classes as used in UMTS. Access classes (ACs) may be allocated by the operator and stored in the universal subscriber identity module (USIM) except for access class 10, which is special and reserved for emergency calls. There may be a total of 16 access classes. Access classes 0 to 10 may be used by any user, and access classes 11 to 15 are reserved for the operator. For each access class, a 1 bit cell barring status may be designated in the system information block (SIB), such as SIB3. Each cell may bar different access classes at different periods of time by updating the system information (SI).

The physical random access channel (PRACH) resources, (such as access slots and preamble signatures for frequency division duplex (FDD)), may be divided between different access service classes (ASCs) in order to provide different priorities of RACH usage. It may be possible for one or more ASC to be assigned to the same access slot/signature space in FDD. ASCs may be numbered in the range $0 \leq i \leq NumASC \leq 7$, for a maximum number of 8 classes. An ASC may be defined by an identifier, i, that defines a certain partition of the PRACH resources and an associated persistence value Pi. A set of ASC parameters consists of "NumASC+1" such parameters (i, Pi), i=0, . . . , NumASC.

PRACH partitions may be established using the information element (IE) "PRACH partitioning". The persistence values Pi may be associated with each ASC and may be derived from the dynamic persistence level N, which value ranges from 1 to 8. The dynamic persistence level N may be broadcast in SIB7, and the persistence scaling factors (Si), may be broadcast in SIB5, SIB5bis, and/or SIB6. As shown in Table 1, the ASC enumeration may be such that it corresponds to the order of priority (ASC 0=highest priority, ASC 7=lowest priority). ASC 0 may be used in case of an emergency call or for reasons with equivalent priority.

TABLE 1

$P(N) = 2^{-(N-1)}$

| ASC # i | | | | | | | |
|---|---|---|---|---|---|---|---|
| 0 | 1 | 2 | 3 | 4 | 5 | 6 | 7 |
| $P_i$   1 | P(N) | $s_2$ P(N) | $s_3$ P(N) | $s_4$ P(N) | $s_5$ P(N) | $s_6$ P(N) | $s_7$ P(N) |

During radio bearer setup or reconfiguration, each involved logical channel may be assigned a medium access control (MAC) logical channel priority (MLP) in the range 1 to 8. When the MAC sublayer is configured for RACH transmission in the WTRU, the MLP levels may be used for ASC selection on the MAC.

The following ASC selection scheme may be applied, where NumASC is the highest available ASC number and MinMLP is the highest logical channel priority assigned to one logical channel. When all the transport blocks (TBs) in the TB set have the same MLP, then ASC=min (NumASC, MLP) may be selected. When the transport blocks (TBs) in the TB set have a different priority, then determine the highest priority level MinMLP and select ASC=min(NumASC, MinMLP).

Access Classes may be applied at initial access, when sending an RRC CONNECTION REQUEST message. A mapping between access classes (AC) and Access Service Class (ASC) may be indicated by the IE "AC-to-ASC mapping" in SIB5 or SIB5bis. The correspondence between AC and ASC may be indicated as shown in Table 2.

TABLE 2

| AC | 0-9 | 10 | 11 | 12 | 13 | 14 | 15 |
|---|---|---|---|---|---|---|---|
| ASC | $1^{st}$ IE | $2^{nd}$ IE | $3^{rd}$ IE | $4^{th}$ IE | $5^{th}$ IE | $6^{th}$ IE | $7^{th}$ IE |

In Table 2, the "$n^{th}$ IE" may designate an ASC number i in the range 0-7, to an AC. For the random access and the enhanced uplink in CELL_FACH state and Idle mode, the parameters implied by the respective ASC may be used. In case the WTRU is a member of several ACs, the WTRU may select the ASC for the highest AC number. In a connected mode, AC may not be applied.

Unlike the access classes used in UMTS, the WTRU may not have special access class values of 11-15 in LTE. The WTRU may draw a random number R between the values of 0 and 1. If R<ac-BarringFactor, the WTRU may not be barred from access to the cell. Values of ac-BarringFactor and ac-BarringTime may be different depending on the type of connection request, signaling or data, and may be signaled in SIB2. Special barring bits may be broadcast for special AC values 11-15. In this case, the bit indicates if the cell may be barred. There may be one bit used for emergency calls, ac-BarringForEmergency, indicating if the cell may be barred for emergency calls.

In LTE, the random access procedure in MAC may not depend on the AC. The network broadcasts a PRACH configuration index (0 to 63) indicating which preamble format, system frame number (SFN) if one exists, and subframe number(s). The WTRU may be allowed to use this configuration, which may be common to all the WTRUs within the same cell coverage area.

In LTE, in a connected mode, when the network has data to transmit to the WTRU and the WTRU may not be synchronized, the network may trigger the RACH access procedure in the WTRU. The RACH access procedure in the WTRU may be triggered by using a physical downlink control channel (PDCCH) order, in which it may optionally indicate the preamble index and PRACH mask index. If the decoded preamble index is different from 000 000, then the WTRU may start a contention free random access procedure, otherwise it may start a contention based random access procedure. The cyclic redundancy check (CRC) of the PDCCH may be scrambled with the cell radio network temporary identity (C-RNTI) of the WTRU.

For High-Speed Packet Access Plus (HSPA+), when referred to hereafter, E-DCH resource may comprise a set of resources that the WTRU requires to transmit in the UL and receive control channels in the UL. This includes, but is not limited to a scrambling code, fractional dedicated physical channel (F-DPCH), E-DCH absolute grant channel (E-AGCH), E-DCH absolute relative grant channel (E-RGCH), E-DCH hybrid automatic repeat request (HARQ) indicator channel (E-HICH), or similar channels. Some groups of MTC devices may not be given an E-AGCH at all, since there is no dedicated radio network temporary identity (RNTI).

Throughout this disclosure, the terms group identity (ID), group users, group of WTRUs, MTC device group, or the like may be used interchangeably and may refer to a group of WTRUs or users sharing similar characteristics amongst each other (group of WTRUs). This may for instance include but is not limited to: WTRUs belonging to a subset of MTC classes such as time tolerant, time controlled, low mobility, or the like; WTRUs configured with a type of data or application; WTRUs belonging to a certain Internet protocol (IP) service or containing a certain IP address or containing the same first or last x bits of the IP addresses; WTRUs containing the same gateway address; WTRUs belonging to a certain MTC server; a group according to a network preference; a group according to the maximum data rate a MTC device may be allowed to transmit or may be capable of transmitting; or a group according to the priority of the data the MTC device transmits. A WTRU may have different group identities depending on the different types of data or applications it may be transmitting. A group may also consist of all MTC devices or devices that are not MTC but are grouped together according to a feature or property.

The group definitions above are examples and the grouping may either be network defined, MTC higher level defined, predefined, or similar. The embodiments described herein are applicable to any wireless technology, such as UMTS, LTE, global system for mobile communications (GSM), cdma2000, IEEE 802.xx, or any other wireless technology. The WTRUs, MTC devices, and users are used interchangeably throughout the description. A WTRU may correspond to a MTC device or any user belonging to a group.

Described herein are example methods for optimizing UL RACH access by resource time sharing between WTRUs. These methods allow a group of WTRUs (or users) that initiate access simultaneously or within a short period of time, to access a set or subset of RACH resources by spreading their UL RACH access over time and decreasing the chances of collision.

In one optimizing UL RACH access example, UL access may be optimized amongst WTRUs that are scheduled to transmit at approximately the same time or that are polled for information at the same time by time sharing resources amongst the WTRUs. This may be applicable to a group of WTRUs. If the WTRU does not belong to such a group or the data it is transmitting does not belong to such a group, it may use the normal legacy procedure to access the RACH at the time of transmission without having to wait for the specific time as described below. The procedures described below however may be applicable to other WTRUs that do not necessarily belong to an MTC group or class or are MTC WTRUs. For example, these other WTRUs may be configured to act or behave in accordance with the procedures described herein.

Figure 2:
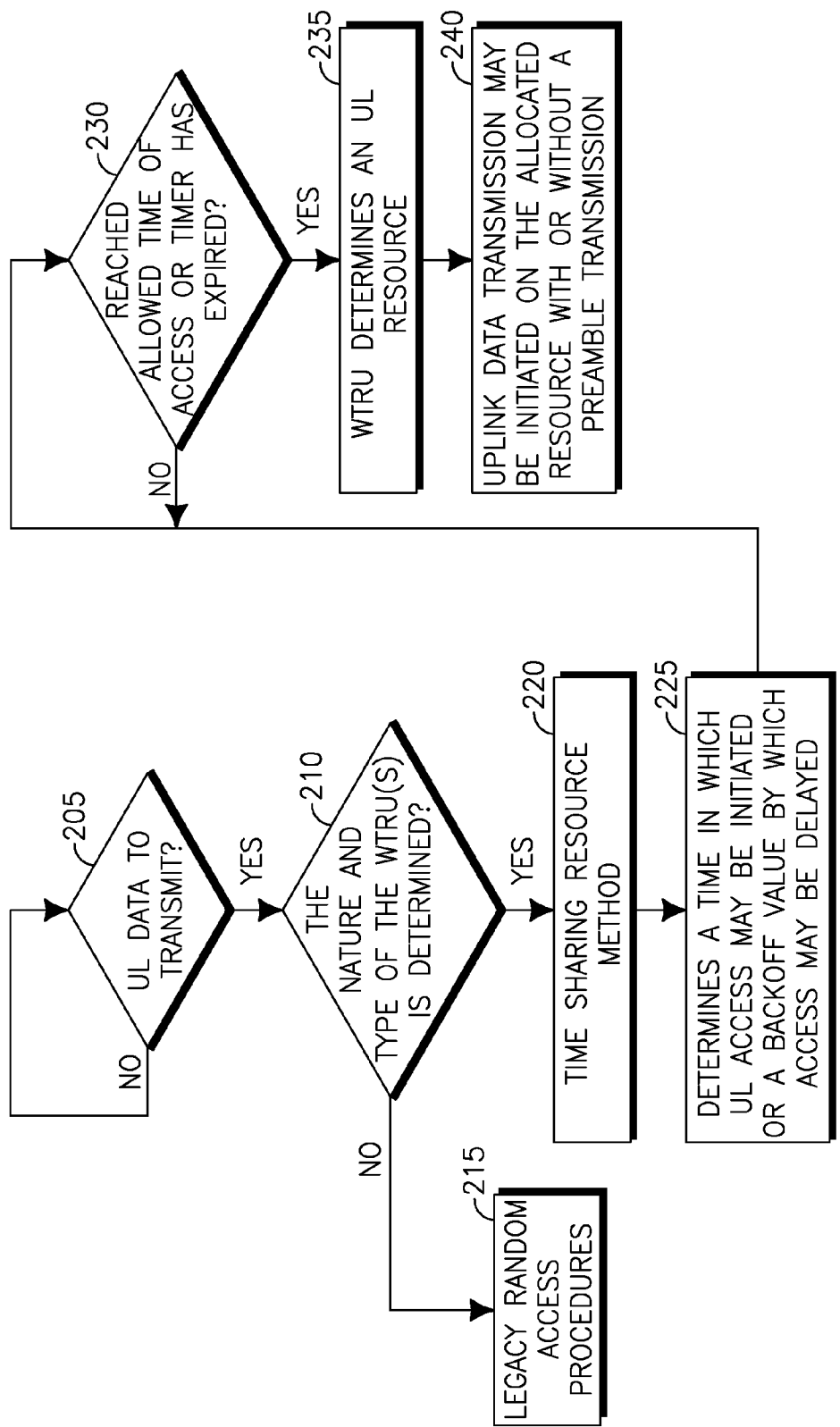
FIG. 2 shows a high level flowchart of an example method for time sharing resources.

FIG. 2 shows a high level flowchart 200 of the example method for time sharing resources. In general, the WTRU determines whether it has UL data to transmit (205). If it has data to transmit, the WTRU determines the nature and type of the WTRU (210). If the WTRU is not a member of a group or configured accordingly, then legacy random access procedures may be used (215). If the WTRU is a member of a group or is configured accordingly, then a time spreading method may be used (220). The WTRU determines a time in which UL access may be initiated or a backoff value by which access may be delayed (225). The WTRU then determines whether the allowed time of access has been reached or the backoff timer has expired (230). If allowed time of access has not been reached or timer has not expired, then keep waiting. If the allowed time of access has been reached or the timer has expired, then the WTRU determines an UL resource from a set of broadcast RACH resources or a resource specifically configured for the type and group the WTRU belongs to (235). Uplink data transmission may be initiated on the allocated resource with or without a preamble transmission (240).

A given group of WTRUs may be provided a subset of resources or one resource that they may use to transmit data in the UL. In order to minimize or eliminate collisions, the time at which the WTRUs belonging to the same group may transmit in the UL may be spread across a predefined amount of time. More specifically, a WTRU belonging to such group or configured with such behavior may initiate UL transmissions at a predefined time interval, a system frame number (SFN) or after a specific amount of time, that the WTRU determines prior to starting UL transmission. The time in which the WTRU determines it may start UL transmission may vary across all WTRUs in the same group. That is, the determined UL transmission time may be absolute or relative.

Alternatively, the WTRU may choose amongst a set of available resources and may start preamble transmission, and the time of UL transmission may be determined for each WTRU and spread over a predefined period of time in such a way that the probability of collisions is reduced.

The time at which the WTRU may start transmission or backoff time until it starts UL access may be determined in one or a combination of the following ways. The WTRU may start transmission at a given SFN or time which may be determined by calculating a SFN or access time based on the WTRU specific identity, which includes but is not limited to WTRU specific, international mobile subscriber identity (IMSI), temporary mobile subscriber identity (TMSI), MTC specific device identity, IP address, or the like. For example a time instance or backoff time may be determined using the formula WTRU-ID mod t, where t in one example may be the time over which data transmission may be spread. Another example of determining SFN based on the WTRU identity may be WTRU-ID mod 2^x), where x corresponds to the number of bits used for SFN. It is understood that a further offset may be added to the formula.

Alternatively, the SFN or time of transmission may be calculated based on a predefined time instance plus an additional offset or backoff with respect to a time instance, where the additional offset may be based on a WTRU specific identity, an index, or a WTRU access ID. For example, as described above, the offset or backoff value may be determined by the formula WTRU-ID mod t, where t is the time over which data may be spread. In another example, each WTRU, (upon initial power up, registration, or already preconfigured), may be given an access ID number or a unique number within the MTC group. The time at which the WTRU starts transmission is based on the initial time instance and the access ID or index. The initial time instance or initial SFN may correspond to one or a combination of the following: the time at which data is generated; the time at which data may be transmitted; the time at which RRC triggers a RRC connection request; the time at which the WTRU checks for access class barring; the time after the WTRU has determined it is not barred (e.g., once the WTRU is allowed to access the RACH); the time after the persistency check in the WTRU determines that it is allowed to start transmission; the time after according to the persistency check the WTRU determines that it is not allowed transmission, (for example, the WTRU performs a persistency check and it fails, at which point it only attempts another persistency check after a backoff time determined according to any of the embodiments described herein); the time at which the WTRU may make its first preamble request if such additional time offsets were not defined; the time at which the WTRU is polled for information; a predefined timer, which triggers the WTRU to wake up and report certain information to the network; an explicit SFN number signaled by the network to the WTRU, for example via paging or broadcast channel, or upon initial registration;

the time at which a WTRU is paged; the time at which the WTRU is explicitly told to start transmission; an SFN number provided to the WTRU via a radio resource control (RRC) message or via a paging message; or the time at which a certain procedure in the WTRU is triggered in the WTRU that requires a control message to be sent to the network. For example, such procedures may include but are not limited to cell reselection, area update, mobility and the like.

Alternatively, the SFN, time instance, or backoff may correspond to an index, an access ID, or a number set in the WTRU. Within a time period from the point in which the WTRU wakes up or has data to transmit, it may transmit on the SFN corresponding to the assigned access ID. For example, the SFN may be equal to the WTRU access ID.

Alternatively, the index or the offset with respect to the initial time instance as determined above or backoff time may be by a random number generated between zero and a maximum time (Tmax_backoff) or between a range of numbers, N to M. This maximum time or range may be explicitly configured in the WTRU and/or may be implicitly determined by application specific parameters. For instance, for time intolerant applications, the WTRU may transmit the data within a maximum time period. The backoff number used by the WTRU may be provided in a paging message or an RRC message, (such as a RRC connection release or reject), for use in the next access. The initial backoff or time randomization, may take place at the MAC or Physical layer lever, e.g. before the random access procedure is initiated, or it can take place at higher layers such as the RRC. This may be part of the RRC access class barring procedure (additional delay/randomization added for this group of WTRUs), or a new procedure may be added that delays the transmission of the RRC connection in the RRC by the WTRU determined time.

Once an SFN is determined or time instance is determined, the WTRU may start transmission within that SFN or within the determined time in the next available RACH opportunity. Equivalently, the time of access can be determined by starting a timer (e.g. the backoff timer) that is equal to the value as determined herein, e.g. time offset or backoff. Once the timer expires the WTRU initiates UL access.

The WTRU may start UL transmission in accordance with a time pattern of the WTRU that may be used in controlling access to the network. These time patterns are described herein below.

Additionally, the WTRU may determine the sub-frame or TTI within a determined SFN that it can initiate data transmission or initiate the RACH procedures. This may be determined by one or a combination of the following: a predefined rule may be used, (e.g., the WTRU may start at the beginning of the SFN or x subframes or TTIs within the frame); the WTRU may randomly choose a sub-frame; the WTRU may rely on the RACH procedures and the available sub-frames or access slots broadcasted within the set of resources or the provided grant; or the WTRU may determine it according to the sub-frame as allowed by the configured RACH configuration index.

In a network triggered solution, an explicit message from the network may be used to indicate to the users to start transmission. For example, the WTRU may have data to transmit, but it may not transmit unless explicitly initiated by the network via polling, paging or any other mechanism. This may be performed by explicit L1/L2 or L3 signaling that indicates to the WTRU to start transmission according to the next SFN number or time instance calculated by the WTRU. For example, in order to control uplink (UL) transmission of some WTRUs, the network may use the paging indicator to trigger the WTRU to transmit the data they need to transmit within that group.

Figure 3:
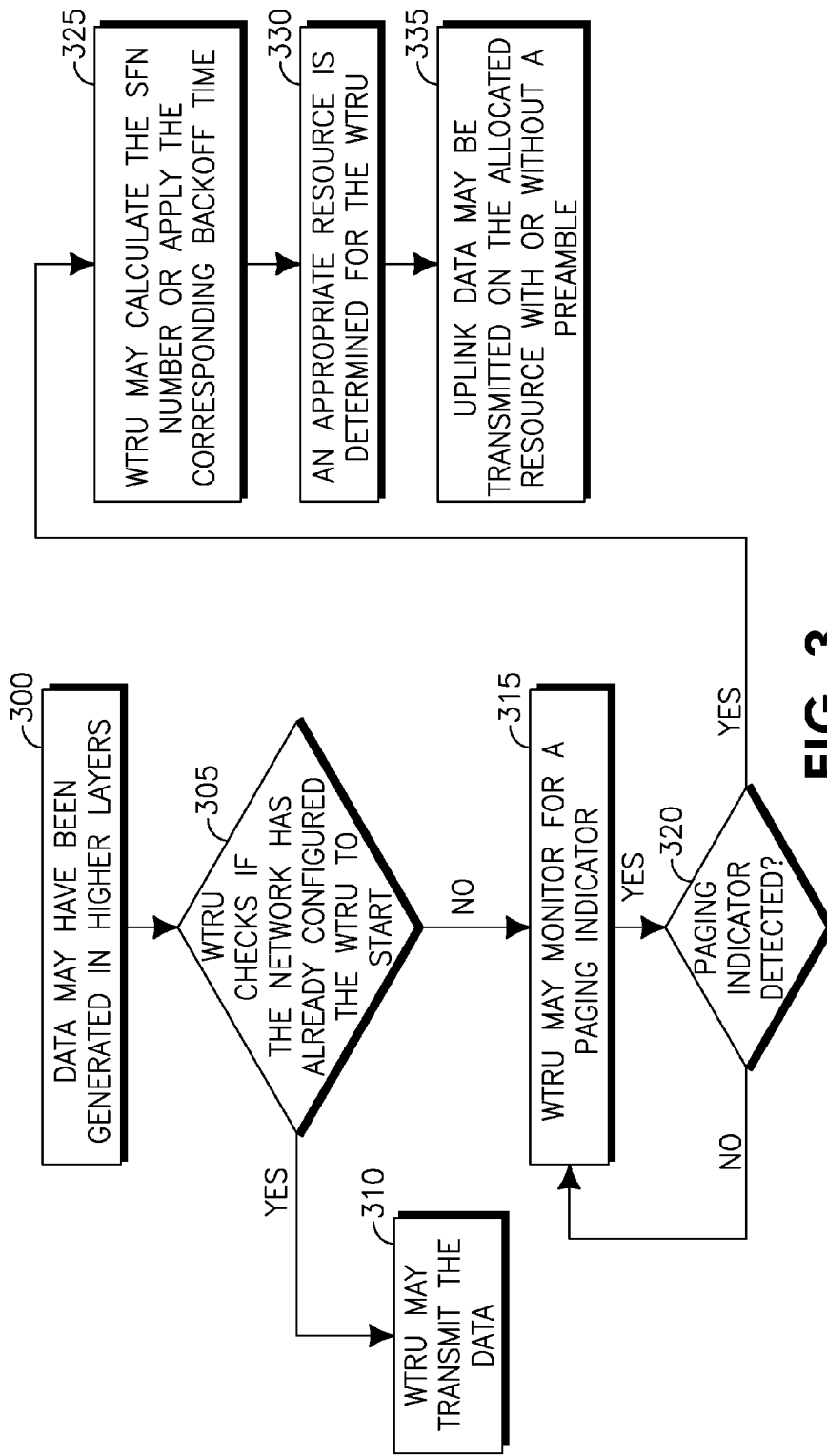
FIG. 3 shows a high level flowchart of a network triggered method for time sharing resources.

For example, as shown in FIG. 3, for a predefined group of WTRUs, the data may have been generated in higher layers (300). The WTRU checks if the network has already configured the WTRU to start, (e.g., the message to start the transmission has been received prior to the data being generated) (305). If the WTRU is configured, then the WTRU may transmit the data (310). If such an indication has not been received, the WTRU may wait for a L1 or L2/L3 signal to start the RACH transmission. In the example of a paging indicator, the WTRU may monitor for a paging indicator (315). If the WTRU detects that a paging indication is received for the group the WTRU belongs to or for the WTRU itself (320), then the WTRU may calculate the SFN number or apply the corresponding backoff time (325), determine the resources it may transmit on (330) and start transmission according to the determined time, resource and procedures as defined below (335). Otherwise, the WTRU continues monitoring for the paging indicator. The WTRU may be provided with the backoff, offset or any of the above parameters in the paging or polling message. This may allow the network to dynamically change the backoff or parameters in the paging or polling message.

The solutions described herein may have an additional restriction in that the final time of transmission may not exceed the allowed time interval in which some WTRU devices, namely MTC devices, may be required to transmit. More specifically, some MTC devices with time intolerant transmissions may have to send the data within a predefined time interval. Therefore, the example methods described herein may be modified to ensure that such time interval is not exceeded. For example, this may be determined as the minimum between the allowed time and the calculated time. Alternatively, a method may be used that allows the time instance to be within the interval. For example, for the offset solution described herein above, a final offset may equal the calculated offset mod (time interval offset), where the time interval offset may be the remaining time with respect to the final time interval and the time the data was generated.

Described herein are methods for determining RACH access backoff parameters and priorities. As discussed above, the maximum backoff duration or offset required for any of the embodiments described above, (referred hereafter as $T_{MAX\_Backoff}$), that the WTRU may apply before starting its UL access may be a group specific parameter or a WTRU specific parameter. More specifically, the parameter may be configured in one or a combination of the following ways. In a configuration example, one backoff value may be specified per MTC class. Alternatively, one backoff value may be specified per group of MTC devices.

Alternatively, one backoff value may be specified per MTC or access class. In this example, all WTRUs corresponding to this class may use the same backoff parameter. Alternatively in this example, each group of WTRUs or each WTRU configured may be provided with an additional factor that may be used to scale the backoff value provided for all MTC devices or class. The WTRU may then multiply this scaling factor with the backoff value provided to determine the final backoff value to use.

Alternatively, a number of values may be configured and based on the priority configuration of the WTRU or the priority of the service or application that has initiated data transmission, (e.g., priority of application). The WTRU may use the value that corresponds to the configured priority.

The network may broadcast in the system information or signal at the RRC level using an RRC message, (e.g., in the paging message), or at the non-access stratum (NAS) level, (e.g., in the Attach Complete, Authentication Request, routing area update (RAU), location area update (LAU) or tracking area update (TAU) Accept), different values of $T_{MAX\_Backoff}$ as follows: a list of different $T_{MAX\_Backoff}$ durations each corresponding to a different priority, (e.g., $T_0, \ldots T_{N-1}$ where N is the number of priorities or groups); or a list of scaling parameters to apply to one $T_{MAX\_Backoff}$ which may be configured as discussed above, (e.g., one value for all devices, one value per class, and the like), each corresponding to a different priority. Alternatively, these scaling parameters may be fixed values and in this case the network may broadcast or signal the backoff value. The MTC device may determine the list of the different backoff values by using the different scaling factors, (e.g., multiplying or dividing the corresponding $T_{MAX\_Backoff}$ by the scaling factor corresponding to the priority of the data or service being provided).

The priority that the MTC device may use may be determined with one or a combination of the following methods. The MTC may directly depend on the group or type the MTC device belongs to. This may, for example, be indicated on the universal subscriber identity module (USIM). For instance, a time tolerant MTC device may use a lower priority, and hence a longer backoff parameter than a time constraint MTC device.

Alternatively, it may depend on the type of data the MTC device may send. For example, the MTC device may use a shorter backoff for high priority data like alarms than when sending periodic metering results. The priority of the data may be determined at the application level or at the NAS level and be indicated to the RRC or MAC.

Alternatively, it may depend on the Quality of Service (QoS). For instance, each priority may be derived from the QoS class which defines the delay sensitivity of the traffic, (i.e., data the MTC device may send). Existing QoS classes may be reused, or new QoS classes or sub-classes, (for instance, sub-classes of the Background Class), may be defined for MTC devices.

Alternatively, the priorities the MTC device may select may be limited by the "WTRU capabilities." Alternatively, the priority may depend on the amount of data the MTC device may send. For instance, it may be foreseen that alarms are short messages requiring a high priority, while periodic metering reports may contain more data and may require a lower priority.

Throughout this disclosure the network may configure one WTRU or a group of WTRUs with some MTC specific parameters, such as backoffs, timing, access classes, priorities, and the like. Such parameters may be configured either over the RACH or via RRC specific messages. One or a combination of the following methods may be used for differentiating between the MTC groups and to allow the network to configure these specific parameters.

The MTC groups may be mapped to new access classes defined for MTC devices as described below. Alternatively, there may be one new access class defined for MTC devices, but sub-access classes may be defined under this new access class. Each sub-access class may correspond to one MTC group or a finite set of sub-access classes may be defined. Each service/group or application may then map to one of these sub-classes. The network may then signal MTC specific parameters for each sub-access class.

A list of different MTC groups IDs may be defined and each MTC service or MTC device may be assigned a group ID. In case each MTC service is assigned a group ID, it may lead to one MTC device belonging to different groups and using a particular group ID depending on the service triggered.

No fixed number of MTC groups may be defined but a maximum number of MTC devices groups may be defined. The network may decide to use a higher or lower number of MTC groups depending on the level of RACH load, network congestion or the number of deployed MTC devices in an area, for example. Each MTC device may be assigned one or several MTC group ID(s) that may change over time.

There may be a maximum number of MTC devices or MTC services using the same group ID. Additionally this number may be limited per cell or per area, (e.g., location area, routing area, tracking area, and the like).

The network may signal which RACH resources or access backoff parameter a particular group ID may use or which group IDs are barred with one or a combination of the following methods. The network may explicitly provide the group ID or a list of group IDs for which the group resources belong to. Alternatively, the network may broadcast a mapping table with the list of the different MTC groups IDs and the corresponding RACH resource or RACH access backoff/barring parameter. Alternatively this mapping table may be fixed.

In another signaling method, the group ID may be assigned to the WTRU in one of the registration messages or in a new NAS message. Alternatively, the group ID and/or mapping may be provided to the WTRU in the USIM. Alternatively, the group ID may be assigned to the WTRU in a paging message. Alternatively, when the WTRU receives a new group ID from the network, it may use it for the next transmission or for all the future transmissions until a new group ID is received. The received group ID may replace the existing group ID or be added to the existing group IDs in a list of group IDs. There may be a maximum number of group IDs the WTRU may be assigned to. The network may indicate to the WTRU to delete an existing group ID. The WTRU may delete the oldest group ID when it reaches the maximum number of group IDs stored.

In another signaling method, the group ID may be fixed per MTC device or per MTC service. For example, it may be stored on the USIM as part of the subscriber profile. Alternatively, the group ID may be updated in the MTC device by using any existing RRC or NAS signaling message or using a new RRC or NAS message.

In another signaling method, in case of a finite sub-set of classes or assigned priorities the system information may provide a list of parameters for each of these sub-sets, (e.g., from 0 . . . N, where N is the number of sub-sets). The WTRU, based on the predefined mapping or explicit mapping in the USIM, or NAS level message or RRC level message, may determine which sub-set number it corresponds to and apply those parameters for any procedures requiring those parameters.

After the WTRU determines that it may initiate UL transmissions according to one of the above described methods, the time sharing of the same resources or a subset of resources may be performed at different levels using different methods, i.e., resource allocation. More specifically, all WTRUs within a group or class may be provided a subset or a limited number of the full set of resources that are available for RACH access. These resources may be reserved for MTC specific transmissions within a group or access class. However, since the time at which the WTRU may transmit over this limited resource or resources is spread across time according to one of the methods described above, the WTRUs may be considered to be time sharing the same resource or set of resources. Different WTRUs may perform access to the same resource at different time slots using any of the methods described above. As such, contention free allocation may be used to allocate the appropriate resource. Alternatively, contention based allocation may be used.

One or a combination of the methods described herein makes use of a contention free resource allocation method. This allows the WTRU to have a contention free transmission, (e.g., only this WTRU is transmitting in this resource at a given point in time). It is understood that these solutions may work with or without contention free access.

The set of contention free resources include but are not limited to preamble signature sequences, E-DCH resources for UMTS, (i.e., non-scheduled grant), access slots for preamble transmission, scrambling codes, physical random access channel (PRACH) resource for UMTS and LTE, physical uplink shared channel (PUSCH) resource block allocation for LTE, (i.e., semi-persistent scheduling allocation), physical uplink control channel (PUCCH) resource for LTE, and for systems where an RNTI or dedicated WTRU identity is required to receive resource allocation after preamble, an RNTI may be pre-allocated or reserved for predefined WTRUs.

In order to provide the information to the WTRU, one or a combination of the following methods may be used. In one method, the WTRU may be provided with an index. The index points out which resources are within a list of broadcasted resources that may be used. For example, in UMTS, an index of a contention free E-DCH resource may be signaled or broadcasted individually for a group of WTRUs belonging to a certain category or MTC group. For example, an index to a preamble signature sequence may be provided to the WTRU for any system.

This index may be predefined in the WTRU or may be pre-configured the first time the device registers with the network, powers up, or moves to the cell. This index may be broadcasted for MTC devices or broadcasted for different MTC groups or different access classes. Alternatively, the set of resources to be used may be broadcasted for each MTC group or for any device that needs to use this resource. The resource allocation or index is provided to the WTRU via a paging message or another dedicated message that follows a paging indicator. This dedicated message or paging message may carry additional parameter information such as RNTI, (e.g., temporary RNTI, preamble signature sequence, transmission time interval (TTI) in which to transmit, slot number, resource block).

Alternatively, the message may provide the RNTI to the WTRU or group of WTRUs. Therefore, a specific WTRU at the time that it is scheduled to transmit may monitor the control channels, (e.g., the PDCCH in LTE or the E-AGCH in UMTS) to determine the resources (e.g., resource block, grant, index of resource, or similar resources) over which to transmit in the UL.

Alternatively, the set of resources to use may be provided explicitly, (e.g., the whole configuration message may be sent to the WTRU). It may be sent once at power up or registration or every time the WTRU may transmit. For example in UMTS, the message may be sent to the WTRU via an index to a set of known E-DCH resources.

Alternatively, a predefined rule may be implemented, where the WTRU may know that the transmission may be made on the first, last, or $N^{th}$ resource that is broadcasted. Alternatively, a default set of resources is defined for MTC devices or a group of MTC devices or a class of MTC devices.

The network may reserve the resource for machine to machine (M2M) transmission, unless it knows that no M2M devices are in the vicinity. Alternatively, the WTRU may choose any of the available resources as determined according to access class or as broadcasted for normal RACH procedures; however, it may initiate the first preamble at the calculated time, the SFN value or an absolute time.

In the event that the WTRU may be allocated more than one contention free resource, it may choose amongst them in a given TTI or SFN as provided above. For example, the WTRU may monitor the control channels or apply a predefined rule to determine the appropriate resources.

Described herein are methods for UL transmission on the allocated resources. In one UL transmission method, the WTRUs time sharing the resource start UL transmission at the given SFN or slot, without transmitting the preamble. Therefore, the WTRU determines the SFN, subframe, or TTI and starts immediately with UL transmission of the data, skipping the preamble ramp up phase. For example, for LTE it may start to transmit data over the PUSCH according to the provided allocation or for UMTS it may transmit over the PRACH or over the E-DCH resource.

The above method may be particularly beneficial for some systems such as UMTS. More specifically, given that the WTRU is the device that has access to this resource, it may not have to send the preamble. The WTRU may start transmission on the UL at the given SFN. The WTRU may use the following method to reduce interference and transmit the enhanced dedicated physical data channel (E-DPDCH) at the correct power level. A WTRU may start with dedicated physical control channel (DPCCH) transmissions for x TTIs prior to E-DPCCH transmission. The WTRU then starts PRACH transmission. The initial power of the DPCCH or that of the PRACH may be set according to one or a combination of the following rules: use a default DPCCH power which is signaled or a default PRACH power offset; determine using DL measurements (e.g., common pilot channel (CPICH) measurements); the WTRU may save and then use a last transmit power, which is especially useful for non-mobile WTRUs and starts at that power minus an offset; or use a minimum between a current and a signaled value.

In an LTE system, transmission in the UL generally requires the WTRU to be time aligned, except for the RACH. To avoid a needless RACH procedure to regain time alignment every time a WTRU transmits, a MTC WTRU may be allowed to reuse its timing advance value from the last time it was in RRC connected mode. However, this may be permissible under the condition that the WTRU's physical position has not changed. This may be performed by use of positioning estimate based on for example global positioning system (GPS). It may also be determined from an output from a motion detecting device indicating absence of motion. Alternatively, a path loss estimate from the base station based on received signal strength may be used. Alternatively, the WTRU may belong to a non-mobile group, (e.g., it is known ahead of time that this device does not move). The WTRU may determine that it is a stationary device, may acquire the time advance once at the beginning and every time it has UL transmissions, and then may use the same timing advance information without having to transmit a preamble.

For systems such as LTE, starting without a preamble may be more challenging given that the WTRU may not have the timing advance information, which is received in the random access (RA) response message. In a method where no preamble may be transmitted, the WTRU may transmit a limited amount of data on the assigned PUSCH resources by using a guard period as part of the data transmission to account for the worst case timing uncertainty and avoid interference with subsequent sub-frames. Such an approach may require that the WTRU be allocated all symbols of the time slot for every sub-carrier.

In another UL transmission method, the WTRU may perform preamble transmission at a predefined time, on a predefined SFN and/or subframe, TTI or access slot. The WTRU may determine the initial power of the preamble according to known procedures. Alternatively, for some types of WTRUs, the initial power of the preamble transmission may be optimized according to WTRU position. More specifically, certain non-mobile or stationary devices may determine the initial preamble power by one or a combination of the following methods. In one method, the non-mobile WTRUs may use the last preamble transmission power of the last access attempt, e.g., the WTRU stores the last value used. If there is no value stored, the WTRU may use the normal preamble ramp up phase and then store the last value of the preamble. Alternatively, the WTRU may perform the preamble ramp-up phase once at the beginning and then may use the same value for all initial accesses. This method, however, may not allow the WTRU to update and adjust the preamble power based on the last access.

This UL transmission method may allow the WTRU to achieve full synchronization in the UL and perform proper power ramping. The WTRU may use the contention free allocated resource to transmit in the UL, or if more than one resource is provided to the WTRU, it may use the legacy RACH procedure. That is, if several resources are available, the WTRU may randomly choose one resource to perform access to the WTRU.

In another UL transmission method, certain WTRUs such as the MTC devices may not perform the power ramp-up procedure for every preamble retransmission. Instead, power ramp-up may be done every $N^{th}$ retry. 'N' may be a configurable parameter and may be MTC feature/group specific. 'N' may either be programmed in the WTRU during initial deployment/configuration or may be provided to the WTRU by the network via broadcast or dedicated signaling.

For example, 'N' may be equal to $M_{max}$ in UMTS and preambleTransMax in LTE, (maximum number of preamble retransmissions), for MTC devices that may be known to be physically stationary. In this case, the WTRU may not increase the preamble transmit power for any of the retransmissions. Preamble transmission failure for MTC devices that may be stationary, (and hence a fixed distance from the base station) may occur due to RACH congestion rather than bad channel conditions. Therefore, constant increasing of the preamble transmit power may result in degradation to the network.

Described herein are methods for limiting the RACH access period. That is, the time for which the WTRU maintains the resource is limited to a predefined or configured period. More specifically, the WTRU may determine the SFN number or the time at which to start transmission according to any of the methods and solutions described above. From the initial uplink transmission, the WTRU may be configured to stop transmitting and release the resource once the allowed timer expires.

For certain WTRUs, such as MTC devices, where one small data transmission may occur at frequent times, the WTRU may need a few frames or sub-frames to transmit the data. The length of resource keeping may be dependent and configured based on the access class or MTC group, or it may be common across all WTRUs configured to perform such procedures.

In order to avoid having WTRUs initiate transmission while another WTRU is transmitting, the RACH resource time duration or frame duration may be used as an input to the formula which the WTRU uses to determine when to start transmission. For example, if the maximum transmission duration is two frames, then the SFNs at which the WTRUs within that same group starts may be multiples of two, (e.g., odd or even numbers). In this example, time durations of X frames may correspond to WTRUs starting transmission in SFN numbers that are multiples of X. The above is an example and different mechanisms of calculating the SFN combined with frame duration, WTRU identity or the like may be used.

In another method, when the time duration for each transmission is limited, the WTRU may have a simplified behavior wherein no hybrid automatic repeat request (HARQ) feedback may be sent for UL transmissions. This may be achieved by repeat HARQ mechanisms. The WTRU may create one packet data unit (PDU) and retransmit in x consecutive TTIs, or in N TTIs within the allowed time frame.

In order to uniquely identify the WTRU transmitting in this TTI, the WTRU may append the specific identity to the MAC header or the data itself. This identity may be a MTC specific identity, an IMSI, TMSI or any identity that uniquely identifies the WTRU. The WTRU may use a special header field to indicate to the network which identity it is providing. Alternatively, the time instance at which the WTRU transmits may be unique to a WTRU and the network may use the same or a similar mechanism to determine which WTRU is transmitting. Therefore, the network may know that the resources are allocated to one WTRU from the given SFN to the SFN+duration time.

The decision on whether or not to perform HARQ retransmission based on feedback may be linked to the time duration of the RACH. Alternatively, if more than one frame or if the WTRU is allocated more than a predetermined amount of time, for example 10 ms, the WTRU may perform HARQ retransmissions.

When the time expires, the WTRU upon completion of its transmission interval may release the resources. The WTRU may release the resource as soon as it has completed transmission of data and may reset internal variables. If the network is using a common resource and buffers, at the end of the time, it may reset the variables and sequence numbering of packets.

In another example optimizing UL RACH access method, group scheduling may be used to further minimize RACH collisions and retransmissions in scenarios where a considerable number of WTRUs try to communicate with the network (NW) at the same time. The WTRUs may be divided into groups and their random access procedure may be scheduled in a deterministic way. A group index, (i.e., rachGroupIndex), may be used to identify the WTRUs belonging to a particular group. The groups may be prioritized based on different aspects such as the amount of data the WTRUs may transmit, the critical nature of the data or other similar parameters.

In this method, the WTRUs may derive their group index from the system information obtained from the NW or the NW may provide it to the WTRUs via dedicated signaling. The group index may be randomly picked amongst the different groups that the WTRU may pick from.

The WTRUs within a certain group may start RACH transmission within a time interval associated with the group index. In order to determine when to start within this interval, the WTRUs may be configured to randomly pick a time within this interval and start the RACH procedure. Alternatively, the time may be determined according to one or a combination of the procedures described herein above, with the restriction that it may be within the time interval of the group in which it belongs. For example, the offset or access ID assigned to each WTRU may be added as an offset to time T, the time at which the group may start transmission.

In this method, the time at which the WTRUs are expected to send the data to the NW may be the same, (i.e., t equal to zero), but all the WTRUs' data may not be of the same priority and hence may be spread over a short period of time starting at t equal to zero.

Figure 4:
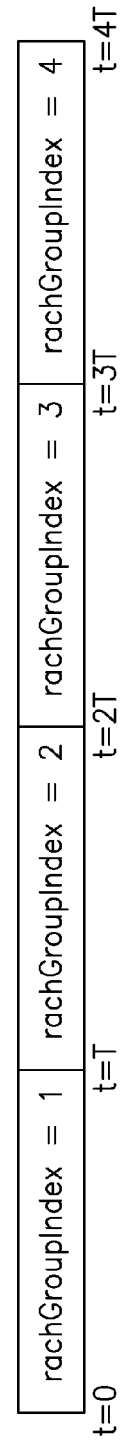
FIG. 4 shows an example diagram for group scheduling.

Referring to FIG. 4, when it is time for the WTRUs to send their data to the NW, (i.e., when the t is equal to zero, as explained above), the WTRUs belonging to rachGroupIndex 1 may start the random access procedure sometime between time t equal to zero and t equal to T. No other WTRU belonging to any other group is expected to start its random access procedure during this time. The WTRUs belonging to rachGroupIndex 2 are expected to perform the random access procedure between time t equal to T and t equal to 2T. In other words, all of the WTRUs belonging to a certain group are expected to perform their random access procedure in their designated time intervals according to their group index. The value T may be configured by the NW, taking into consideration different factors such as the amount data the WTRUs may send, the priority of the data for different groups of WTRUs, or the like. The time may correspond to a SFN number.

The RACH group index method may be applied to the timing or access patterns methods described herein below. More specifically, each RACH group index may have different characteristics, in terms of resources, time at which access is allowed, and access barring factors or persistency value. The WTRU may pick a group index according to any of the methods described above or below. Once a group index is selected, the access characteristics of that group may be obeyed. The RACH group index may be updated dynamically or semi-statically according to the solutions described below. Each RACH group index may be associated to an access class which in turn may have different access characteristics.

Described herein are methods for allocating resources for certain types of WTRUs such as MTC devices. For certain types of WTRUs it may be desirable to segregate RACH resources as opposed to using the RACH used by non-MTC devices. For example, segregation of RACH resources for different MTC devices may include reserving a set of scrambling codes, preamble signatures, and sub-channels/access slots. This may be performed by signaling a new set of parameters for different MTCs, (e.g., a MTC specific PRACH), and within this PRACH, codes and parameters for a new subset of access service classes for different types of MTC devices may be designated.

In UMTS, additional changes may include a reserved space or pool of E-DCH resources, or addition of E-DCH resources for MTC. Given that the normal preamble signatures have a one-to-one mapping with the E-DCH resource index to be used, the WTRU may use a set of special preamble signatures reserved for MTC devices, which have a mapping to a different set of E-DCH resources or are defined by a different mapping.

Alternatively, a set of access slots or subchannels in which the preamble is sent may be reserved for MTC devices or a new access slot may be designated. For example, for UMTS, when the network detects this preamble, it is aware that the mapping between the preamble and the E-DCH corresponds to the MTC specific E-DCH resources. In some instances, some groups of MTC devices may not have E-AGCH resources as there are no dedicated RNTIs.

As stated above, in one example, new access classes may be defined for MTC devices or existing access classes, 0-10, may be extended to allow for different UL access characteristics associated to each class or a group of classes, such as pattern, barring factor, and the like. The access class (AC) information may be programmed into the device's USIM during the subscription of the MTC device, to a particular MTC feature or an MTC group, or during initial deployment of the MTC device.

The AC information may be updated dynamically in any of the following ways. An MTC server may provide new AC information to the network which may forward it to the WTRU via paging, broadcast, (system information or cell broadcast service (CBS)), or dedicated signaling. The WTRU may update the contents of its USIM accordingly. Alternatively, the contents of the USIM may not be changed, but the WTRU may use the new information provided for the duration of the registration connection or for predefined periods of time. If detached, the next time the WTRU accesses the network it may revert back to its original USIM configuration. The modifications to the AC information may be, for example, "delete an existing AC", "add new AC and the like". Alternatively, the AC information modification may be a part of the configuration of the MTC devices and hence may be updated whenever the MTC device is re-configured.

In another example method, the network may provide or modify the AC information to the WTRUs via a network message. A common group message may be sent to a group of MTC devices indicating to them, a change in their AC information. The network may reserve one or a group of ACs to be barred/blocked with a certain predefined probability and configure the WTRUs it wants to bar/block, to be a part of one of these ACs. This may be performed using one or a combination of the methods described herein, (e.g. paging message, predefined rule, and the like).

Segregation may also be implemented using access service classes. Different access service classes (ASCs) may be defined for MTC devices based on the services they provide, their features and the like. The new ASCs may be represented as a new integer value or a bit string. For example, a bit in the string that may be "set" (1) indicates that the WTRU belongs to that ASC while a bit that is "not set" (0) indicates that the WTRU may not be part of that ASC. The mapping of an MTC feature to a bit in the bit string may be provided to the WTRUs in any or all of the following ways. The mapping may be broadcast in the system information (SI) via system information blocks (SIBs). Alternatively, the mapping may be programmed in the USIM of the MTC device during subscription and/or initial deployment of the device.

The mapping of MTC features to bits in the ASC bit string may be dynamically changed and the updated information may be provided to the WTRUs via SI or any other form such as paging or dedicated signaling.

In an alternate embodiment, the mapping may be programmed in the USIM initially and updated values to this mapping may occur when information is received by the MTC device. The values may not be updated in the USIM of the MTC device but may temporarily override those values with the updated values. The duration for which the MTC device may use the updated values may be controlled using a preconfigured timer value provided by the network. This timer value may be MTC group specific, depend on the MTC feature or may be different for each MTC device. The timer value may be provided to the WTRU by the network via SI, paging or any other form of dedicated signaling.

Described herein are example methods for access class to access service class mapping. The AC to ASC mapping for MTC devices may be achieved in one or a combination of the following solutions. The AC to ASC mapping may be provided to the MTC devices as a part of their configuration during initial deployment, subscription to an MTC feature or a group or configuration/re-configuration of the device by the MTC server.

In one method, if an MTC device belongs to more than one AC, the ASC corresponding to its default MTC feature AC may be selected. In another method, a single MTC specific AC may be mapped to an ASC bit string and the WTRU may perform any or all of the following actions. The WTRU may prioritize the ASC bit string values over the ASCs mapped to other ACs in which the WTRU is associated. Within the bit string, if the WTRU is assigned more than one ASC, the WTRU may select the one that belongs to its default MTC feature. Alternatively, the WTRU may select one that is explicitly configured to be used by the network, MTC server and the like. Alternatively, the WTRU may prioritize a list among these ASCs that may be provided to the WTRU and the WTRU selects the ASC according to the priorities. The priorities of the ASC may be provided to the WTRU by the network via SI, paging or any form of dedicated signaling.

Described herein are additional methods for controlling access to the network that may be used in conjunction with the example methods and embodiments described herein.

The WTRU may determine whether to attempt accessing the network according to at least one of the following methods. In one example method, the WTRU may check a Boolean indication, such as a barring indication, indicating that access may or may not be allowed. Alternatively, a time pattern, (referred to hereafter as allowed access pattern), may be used that defines when attempting access to the network may be allowed. The allowed access pattern may be used in conjunction with when the barring indication may be set to allow access. Alternatively, a random number may be selected and the WTRU determining whether the number may be smaller than a threshold, (referred to hereafter as access barring factor). This may be used during an allowed access pattern and if the barring indication may be set to allow access.

One of the allowed access pattern, the barring indication and access barring factor (collectively "access indication") may be determined based on at least one of the factors described herein. For example, the access indication may be determined based on the AC as described herein. The access indication may also be based on the reason for accessing the network, such as but not limited to, availability of mobile originated data and/or reception of a paging message.

In another example, the access indication may be based on an index indicating which of a plurality of allowed access patterns, barring indications or access barring factors may be used by the WTRU. More specifically, a number of allowed access patterns, barring indication or factors may be provided to the WTRU, (e.g. not related to an access class), and the WTRU may determine the index by receiving a paging message containing the index. The index may be received by a paging message containing the index. The paging message may be extended to include an index to access information the WTRU may use. This information is provided to the WTRU using one of the embodiments described above. The WTRU may receive a page message containing an explicit access pattern the WTRU may use, an explicit barring indication or a barring factor. The WTRU may receiving a dedicated message, (such as an RRC connection release message), containing the index or the explicit information. The WTRU may provide an initial index to use at the initial configuration or registration and a predetermined or pre-signaled function of the time of day or type of data to be transmitted.

The index or the information may be provided to the WTRU or determined by the WTRU according to AC or any of the methods described above. The index or the information may be further updated dynamically, without having to change or re-acquire the SIBs, by using one of the methods described above, or by using a predefined rule in the WTRU. More specifically, the WTRU may use one or a combination of the following. The WTRU may periodically change the index of the information it uses. For example, the new index may be determined as a current index+1, or current index+x, where x is an integer number predefined or configurable. Alternatively, the WTRU may change the index after every UL access or after every N UL accesses, for example, new index=current index+x). Alternatively, the WTRU may receive a new index or information using any of the methods described above.

The allowed access patterns, barring indications or access barring factors or plurality thereof (possibly one for each AC and each possible value of the index) may be obtained by the WTRU by acquiring SI broadcast from the cell. They may also be received via a dedicated message, (for instance such as an RRC connection release message or any other RRC reconfiguration message). Alternatively, this information may be provided by a higher layer message, (for example a non-access stratum (NAS) message). It may also be received through a paging message in which one or a group of WTRUs may be paged. The paging message may be extended to provide this information to the WTRU explicitly or by providing information to allow the WTRU to change or pick one of the allowing configurations in the SI. The information may be obtained through a formula in the WTRU based on a WTRU identity to pick an index for one of the above mentioned configurations or another formula that dynamically may change the access class for which the MTC device belongs to. For example in the latter case, the WTRU may provide a range of access classes it may be allowed to belong to and within this range the WTRU may periodically change the access class, (e.g. current access class +x), with a wrap around.

The access barring factor may be determined by the WTRU based on at least one of the following example actions. It may be determined upon receipt of an adjustment factor from a paging message or a dedicated message. Alternatively, the WTRU may multiply an unadjusted access barring factor by the adjustment factor. The unadjusted access barring factor may be obtained from acquiring a SI broadcast from the cell or selecting the unadjusted access barring factor applicable to the AC and/or reason for accessing the network. Alternatively, the access barring factor may be determined by receiving a new access barring factor that may override the existing one.

In another example, the access barring factor may be determined by the WTRU or provided to the WTRU in the SI in new SIBs or in existing SIBs such as SIB3 for UMTS and SIB2 for LTE. The new IEs may specify at which SFNs and optionally subframes a WTRU or a group of WTRUs may be allowed to access the RACH for sending a preamble or for sending UL data. Alternatively, these new IEs may be added in a RRC message. These new IEs may include one or a combination of the following pieces of information. They may include one SFN, a list of SFNs, an indication that certain WTRUs may transmit in odd or even SFNs, every N SFN starting at a certain SFN and a range of SFN, (e.g. start and stop index). The IE may include a start SFN number, at which point the WTRU may attempt to access the network using the current RACH mechanisms. The IE may include a timer value which may correspond to time duration in which once expired, the WTRU may be allowed access the RACH for a certain period of time.

In UMTS, the WTRU may be configured with access time patterns. When the WTRU, in UMTS may require access to the RACH, it may ignore the persistency value and try to access the RACH at the SFN(s) broadcast on the cell or may perform the persistency check but at the SFN(s) broadcast by the cell. In the case of a retransmission, the UMTS may wait for the backoff timer and/or T2, (which is nominally set to 10 ms in the UMTS MAC), before trying to access the RACH. Retransmission may be performed at the next allowed SFN after the backoff timer and/or T2 has expired or it may ignore the backoff timer and/or T2 and try to retransmit at the following allowed SFN.

In LTE, the WTRU may be configured with access time patterns. When the WTRU requires access to the RACH, it may ignore the access restrictions imposed by the Prach-ConfigIndex and/or the PRACH Mask Index. It may transmit on the indicated SFN(s) if the restrictions given by Prach-ConfigIndex and/or the PRACH Mask Index are validated first. In case of a retransmission due to a NACK or a lack of a response from the network, the WTRU may wait for the backoff time duration indicated in the response or randomly drawn and then try to access the RACH at the next allowed SFN and subframe. The WTRU may not wait for the backoff timer to expire, and try to transmit at the next allowed SFN and subframe even if it occurs before the backoff time duration.

When allowed to access the RACH according to the time pattern, the WTRU may consider the access barring factor to be equivalent to 1, for example, it may be ignored if present. Alternatively, the two mechanisms may co-exist, in which case the WTRU may not be allowed to perform access if barred according to the barring factor. The WTRU may be allowed to reattempt the access once the ac-barring timer has expired and adhering to the time pattern.

In addition to the SFN(s), the following parameters may be broadcast or signaled for a WTRU or a group of WTRUs including for example subframe number, preamble format, PRACH resource index, PRACH mask index, PRACH configuration index, PRACH index and preamble index.

Described herein are details on how the barring indication, the allowed access pattern access and the barring factor may be updated to access the RACH without the WTRU having to reacquire the system information or being reconfigured by the network.

A list of barring indications, allowed access patterns and/or barring factors may be broadcast in the SI. The mapping between the different barring indications, allowed access patterns and/or barring factors configurations and the WTRU or groups of WTRU may be broadcast. For example, a mapping table may include a list of indices on access timing configurations along with the corresponding access classes, (if applicable), and optionally barring factors for each configuration. When acquiring the SI, the WTRU may store this list and the current mapping. Later, the mapping may be updated by the network or autonomously by the WTRU following pre-determined rules and the new mapping be applied to a previously stored list of accesses. For example, the mapping may be updated via a page. The page may include a new mapping between the access timing configurations indexes and the access classes. The WTRU may not need to reacquire the SI, but may need to monitor the paging channel.

Additionally, times at which the WTRU may autonomously follow predetermined rules to update the mapping table may be broadcast. For instance, a rule may be to shift the table by one with a wrapping. In this solution, the WTRU my not receive a page except in one of the following instances that may require updating. For example, the WTRU may receive a page when automatic update of the mapping table may occur, cancellation of the automatic update, restart of the automatic update, and update of the rules for the automatic update. A new timer may be defined so that when it expires in the WTRU, the WTRU may perform the automatic update of the mapping table. Alternatively, this may be updated using RRC messages, such as RRC connection release or RRC connection reject. The PRACH resources may be part of one of the indexes used and changed.

Described herein is how to differentiate between access classes at the MAC level. In order to make the PRACH configuration index depend on the AC in LTE, certain PRACH configuration indexes may be allowed to certain AC, for example, as defined in a mapping table between AC and PRACH configuration indexes. Moreover, the table of PRACH configuration indexes may be updated so that additional combinations restricting the access to the RACH may be added. For instance, in addition to "even" or "any" SFN, a subset of SFNs may be allowed. Examples of additional restrictions may be an explicit list of SFNs allowed, an SFN occurring every N SFNs and odd SFNs may be allowed.

The known, existing or legacy tables may be extended with new PRACH configuration indexes, (higher than 63), or new table(s) may be defined. Networks may indicate in the SI which table to use.

In the WTRU, the MAC, (or RRC), may select the PRACH configuration index depending on its AC. Although multiple PRACH configuration indices may be allowed for one AC, the WTRU may have many choices. The WTRU may randomly select one index among them, select the index with the most PRACH opportunities, select the index with the least PRACH opportunities, or select the first or last allowed index.

For retransmissions, in case multiple PRACH configuration indices are allowed for one AC, the WTRU may reuse the same index it used for the previous transmission, or the next allowed one using one of the different following orders. The next allowed one may be determined as the next available index, the index with the highest number of PRACH opportunities after the index just used, or be randomly drawn.

The backoff timer may not be sent in the random access response (RAR) or there may be no RAR. The backoff timer in the WTRU may depend on the AC. There may be a mapping between the indices on the backoff parameter values and the AC broadcast in the system information, for instance in SIB2.

Described herein are methods related to the RACH access procedure being triggered by a PDCCH order. There may be a scenario in LTE, where a high number of MTC devices may be receiving a PDCCH order resulting in network congestion. The congestion may be reduced by sending a PDCCH order to a group of WTRUs by scrambling the CRC of the PDCCH with a group identity assigned to the multiple MTC devices.

In order to avoid having all WTRUs access the same PRACH resources at the same time, the methods described herein may be used. In addition, the network may indicate via the group PDCCH order that the WTRU perform certain actions. For example, the PDCCH order may indicate that the WTRU randomly select a preamble and PRACH mask index or, select a preamble and PRACH mask index depending on its individual identity, (for instance WTRU identity modulo MaxNumberOfPreambles). It may also indicate that the WTRU randomly select an odd or even preamble and PRACH mask index depending on its individual identity. In the event that the WRTU may select a preamble among a subset of preambles depending on its individual identity, it may use the individual identity for the PRACH mask index.

Although PDCCH format 1A may be used, the WTRU may interpret the decoded bits in a different way in case it decodes its group identity in the CRC of the PDCCH. For example, the ten bits available may indicate which method the WTRU may use for selecting the preamble and the PRACH mask index. Additional information may be available, such as the first preamble index and the first PRACH mask index the WTRU may be allowed to use.

Alternatively, a new PDCCH format may be defined in order to indicate to the WTRUs a subset of preambles or a list of preambles and/or a subset or a list of PRACH mask indices the WTRU is allowed to use. When receiving these subsets or lists in the PDCCH order, the WTRU may randomly select a preamble index and/or a PRACH mask index among the subset or list or may select a preamble index and/or a PRACH mask index depending on its individual identity, (for instance IMSI or C-RNTI).

Additionally the PDCCH may be extended to indicate other types of information in addition to the preamble index and the PRACH Mask Index, such as the PRACH configuration index.

Described herein is load balancing via a RRC connection reject. The methods and embodiments described herein for RACH access may be applicable at later stages. For example, the WTRU may attempt an RRC connection procedure, but the network may use a RRC connection Reject to reject the connection with the MTC device, for example, due to network congestion. In order to limit the RRC Connection request attempts and therefore reduce potential signaling and network load due to the MTC devices, additional WTRU behavior may be defined in accordance with this embodiment. For instance, this behavior may particularly apply to time tolerant MTC devices or MTC devices sending low priority messages or data. In addition, the RRC Connection Reject may contain parameters, for example, a backoff time to wait at the physical layer or MAC layer before starting a new RACH access, or a sub-set of RACH resources to use for the next RACH access(es).

At the reception of an RRC Connection Reject, the MTC device (i.e., WTRU) may perform one or a combination of the following actions. In one example, the WTRU may not send another RRC Connection Request even if it may do so based on a timer, for example, wait_time is greater than zero and N300 is greater than zero (e.g., V300≤N300). The WTRU may consider the procedure as unsuccessful, go back to Idle mode and notify the upper layer of the connection failure, unless frequency_info or inter-RAT_info are provided in the RRC Connection Reject. In UMTS, the WTRU may behave as if wait_time was equal to zero, while in LTE a new value zero may be added to the range of wait_time values. When the upper layer, (e.g., the NAS), may receive the connection failure indication from the RRC, it may retry the connection later by use of an internal timer, (which may be any timer in the NAS or passed by the RRC, such as the wait time), or may decide to abort the connection and let the application layer know about the abort.

In another example, the WTRU may not try to reselect a cell in the same frequency or radio access technology (RAT) or consider the cell as barred or inaccessible for wait_time, or for a period of time $T_{Reject\_barring}$. This may be a fixed value, signaled, (for example, in the RRC connection Reject message itself or any other RRC message), broadcast by the network, randomly picked up by the MTC device, or may be linked to wait_time, (e.g., wait_time*N, where N may be a fixed value, randomly picked up by the MTC device, signaled by the network in RRC Connection Reject, or broadcast in the system information). $T_{Reject\_barring}$ may depend on the priority level of the data the MTC device may send. $T_{Reject\_barring}$ may be calculated by using the MTC device unique identity, (e.g., its IMSI). The WTRU may pick a random value between 0 and $T_{rejectbarring}$. This value may determine the time the WTRU may consider the cell as barred or the time the WTRU may consider the cell as not accessible. The final time the WTRU may perform such behavior may be equivalent to wait_time+$T_{rejectbarring}$ determined using any of the methods described above.

In another example, even if frequency_info or inter-RAT_info is provided in the RRC Connection Reject, the MTC device may still not retry to send an RRC Connection Request in the other frequency or RAT. Additionally, it may store the frequency and RAT information for a future access attempt, for instance for use after a certain period of time has elapsed. This period of time may be determined in one of the embodiments described above for $T_{Reject\_barring}$. This may prevent many MTC devices to try to send an RRC Connection Request on the same redirected frequency or RAT at approximately the same time. Alternatively, the WTRU may try to send an RRC Connection Request on the specified frequency or RAT after the period wait_time included in the RRC Connection Reject.

In another example, the WTRU may wait for a period of time longer than wait_time for sending the next RRC Connection Request. This period of time may be determined by one of the methods described for $T_{Reject\_barring}$ or wait_time+$T_{rejectbarring}$. For example this longer wait time may be added as a new IE in the RRC Connection Reject.

In another example, the WTRU may limit the RRC Connection Request attempts to a number lower than a predetermined value, (e.g., N300). This maximum number of attempts specific to MTC devices may be signaled, broadcast, fixed or may be inferred from a predetermined value, (e.g., N300). For instance, it may be N300/X where X may be fixed or determined by the MTC device.

It is understood that these embodiments are equally applicable if only a wait_time is signaled to the WTRU and no $T_{rejectbarring}$ is signaled.

This particular behavior in response to the reception of the RRC Connection Reject may be triggered by one or a combination of the following factors: (1) the fact that the WTRU is an MTC device which may be indicated for example in the USIM card of the WTRU; (2) the fact that the WTRU is a time tolerant MTC device; (3) the fact that the WTRU is sending a time tolerant or low priority message or data, (this may be indicated by the NAS to the RRC), (4) the fact that the RRC Connection Reject indicates the cause "congestion"; (5) the fact that the RRC Connection Reject includes a new type of cause, (for instance called "MTC_congestion"); or (6) in case a new parameter in the system information broadcast in the cell called for example "MTC_connection_reject" is set to TRUE.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method for uplink transmission implemented at a wireless transmit/receive unit (WTRU), comprising:
   receiving a message to trigger the WTRU to start the uplink transmission over a resource shared by a group of WTRUs, wherein the WTRU is a member of the group and the message contains a group index indicating a time interval for the group of WTRUs to start the uplink transmission on the resource;
   determining a transmission time for the WTRU to start the uplink transmission over the resource in response to the message, wherein the transmission time for each WTRU in the group of WTRUs is determined based on a unique identifier for each WTRU and the transmission time occurs within the indicated time interval;
   transmitting the uplink transmission from the WTRU at the determined transmission time over the resource, wherein the WTRU is the only WTRU in the group of WTRUs with access to the resource at the determined transmission time; and
   releasing the resource in response to completing the uplink transmission.

2. The method of claim 1, wherein the transmission time is one of an absolute time or a relative time.

3. The method of claim 2, wherein the absolute time is a system frame number.

4. The method of claim 1, wherein the transmission time is a system frame number.

5. The method of claim 1, wherein the transmission time is determined by delaying transmission by an initial backoff time that is randomly selected.

6. The method of claim 1, wherein the transmission time is derived from an identifier based on the group of WTRUs and the WTRU is a member of the group.

7. The method of claim 1, further comprising:
   determining a resource for performing uplink transmission for data based on a contention free allocation.

8. The method of claim 1, wherein a set of access slots or sub-channels in which a preamble is sent is reserved for machine-type communication WTRUs.

9. The method of claim 1, wherein access classes and access service classes are mapped with machine-type communication (MTC) WTRUs, the transmission time being derived from the mapping between the access classes and access service classes and the MTC WTRUs.

10. The method of claim 1, wherein the transmission time is derived from one of a backoff time or time instance received on a paging message.

11. A wireless transmit/receive unit (WTRU), comprising:
   a receiver configured to receive a message to trigger the WTRU to start an uplink transmission over a resource shared by a group of WTRUs, wherein the WTRU is a member of the group and the message contains a group index indicating a time interval for the group of WTRUs to start the uplink transmission on the resource;
   a processor configured to determine a transmission time for the WTRU to start the uplink transmission over the resource in response to the message, wherein the transmission time for each WTRU in the group of WTRUs is determined based on a unique identifier for each WTRU and the transmission time occurs within the indicated time interval; and
   a transmitter configured to transmit the uplink transmission from the WTRU at the determined transmission time over the resource and release the resource in response to completing the uplink transmission, wherein the WTRU is the only WTRU in the group of WTRUs with access to the resource at the determined transmission time.

12. The WTRU of claim 11, wherein the transmission time is one of an absolute time or a relative time.

13. A system for uplink transmission, comprising:
   a base station including a processor and a transmitter, the processor configured to allocate a resource and the transmitter configured to transmit a message to a group of wireless transmit/receive units (WTRUs); and
   a WTRU including a receiver, a transmitter and a processor, the WTRU being a member of the group of WTRUs,
   wherein the receiver of the WTRU is configured to receive a message to trigger the WTRU to start an uplink transmission over a resource shared by the group of WTRUs, wherein the WTRU is a member of the group and the message contains a group index indicating a time interval for the group of WTRUs to start the uplink transmission on the resource, and
   wherein the processor of the WTRU is configured to determine a transmission time for the WTRU to start the uplink transmission over the resource in response to the message, wherein the transmission time for each WTRU in the group of WTRUs is determined based on a unique identifier for each WTRU and the transmission time occurs within the indicated time interval, and
   wherein the transmitter of the WTRU is configured to transmit the uplink transmission from the WTRU at the determined transmission time over the resource and release the resource in response to completing the uplink transmission, wherein the WTRU is the only WTRU in the group of WTRUs with access to the resource at the determined transmission time.

* * * * *